US009150190B2

(12) United States Patent
Jessup et al.

(10) Patent No.: US 9,150,190 B2
(45) Date of Patent: Oct. 6, 2015

(54) HERMETICALLY SEALED LOCKING RETRACTOR

(75) Inventors: Chris P. Jessup, Sheridan, IN (US); Guy R. Dingman, Westfield, IN (US); Grant Bryant, Frankfort, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 228 days.

(21) Appl. No.: 14/001,369

(22) PCT Filed: Feb. 3, 2012

(86) PCT No.: PCT/US2012/027444
§ 371 (c)(1),
(2), (4) Date: Aug. 23, 2013

(87) PCT Pub. No.: WO2012/119060
PCT Pub. Date: Sep. 7, 2012

(65) Prior Publication Data
US 2013/0327874 A1 Dec. 12, 2013

Related U.S. Application Data

(60) Provisional application No. 61/448,262, filed on Mar. 2, 2011.

(51) Int. Cl.
*B60R 22/02* (2006.01)
*B60R 22/34* (2006.01)
(52) U.S. Cl.
CPC ............... *B60R 22/02* (2013.01); *B60R 22/34* (2013.01); *B60R 2022/3402* (2013.01)

(58) Field of Classification Search
CPC .................. B60R 22/34; B60R 2022/3402
USPC ...................... 242/379, 379.2, 398
See application file for complete search history.

(56) References Cited

U.S. PATENT DOCUMENTS

| 2,394,523 A | 2/1946 | Pancoe |
| 4,228,970 A | 10/1980 | Morinaga |
| 4,307,852 A | 12/1981 | Seifert et al. |

(Continued)

FOREIGN PATENT DOCUMENTS

| DE | 4011762 A1 | 10/1991 |
| DE | 102007048348 A1 | 4/2009 |

(Continued)

OTHER PUBLICATIONS

PCT Search Report and Written Opinion for PCT/US2012027444, completed May 28, 2012.

(Continued)

*Primary Examiner* — Sang Kim
(74) *Attorney, Agent, or Firm* — Barnes & Thornburg LLP

(57) ABSTRACT

An apparatus and method are provided for hermetically sealing locking components of a retractor wherein the retractor has a spool shaft extending therefrom. An open-ended housing has a base and defines an opening through the base into an interior of the housing. The base of the housing is mounted to the retractor with the spool shaft accessible via the opening. The locking components are arranged within the housing. A sealing member is positioned about the opening to form a hermetic seal between the spool shaft and the opening. A cover is hermetically attached to the open end of the housing.

14 Claims, 15 Drawing Sheets

(56) References Cited

U.S. PATENT DOCUMENTS

| | | |
|---|---|---|
| 4,337,952 A | 7/1982 | Wagner |
| 4,522,350 A | 6/1985 | Ernst |
| 4,526,328 A | 7/1985 | Kilpatrick |
| 4,537,363 A | 8/1985 | Thomas |
| 4,555,075 A | 11/1985 | Schmidt et al. |
| 4,691,875 A | 9/1987 | Higbee |
| 4,727,640 A * | 3/1988 | Hollowell ............ 29/434 |
| 5,165,621 A | 11/1992 | Mizuno et al. |
| 5,209,421 A | 5/1993 | Fujiwara et al. |
| 5,529,259 A | 6/1996 | Woydick et al. |
| 5,816,522 A | 10/1998 | Krambeck et al. |
| 5,827,042 A | 10/1998 | Ramsay |
| 6,050,516 A | 4/2000 | Aiston et al. |
| 6,164,581 A | 12/2000 | Freeman et al. |
| 6,199,559 B1 | 3/2001 | Nikolaus et al. |
| 6,234,417 B1 | 5/2001 | Sauder et al. |
| 6,311,571 B1 | 11/2001 | Norton |
| 6,419,178 B1 | 7/2002 | Kohlndorfer et al. |
| 6,547,175 B2 | 4/2003 | Kielwein et al. |
| 7,731,118 B2 | 6/2010 | Ruff et al. |
| 7,802,812 B2 * | 9/2010 | Mayville et al. ............ 280/741 |
| 2005/0205709 A1 | 9/2005 | Kohlndorger et al. |
| 2014/0001299 A1 | 1/2014 | Meyer |
| 2014/0054405 A1 | 2/2014 | Clark et al. |

FOREIGN PATENT DOCUMENTS

| | | |
|---|---|---|
| EP | 0411738 A2 | 2/1991 |
| FR | 2376329 A1 | 7/1978 |
| GB | 1118398 A | 7/1968 |
| GB | 2242347 A | 10/1991 |

OTHER PUBLICATIONS

PCT International Preliminary Report on Patentability and Written Opinion of the PCT International Searching Authority for co-pending PCT/US2012/027444 dated Mar. 20, 2014.

Extended European Search Report for counterpart European Patent Application No. 12 752 782.8-1503 dated Mar. 17, 2015.

* cited by examiner

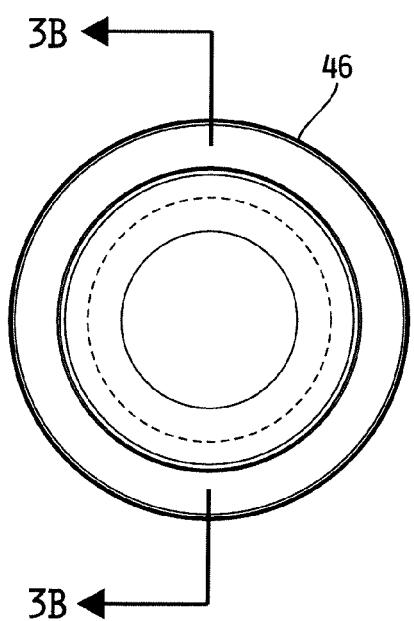
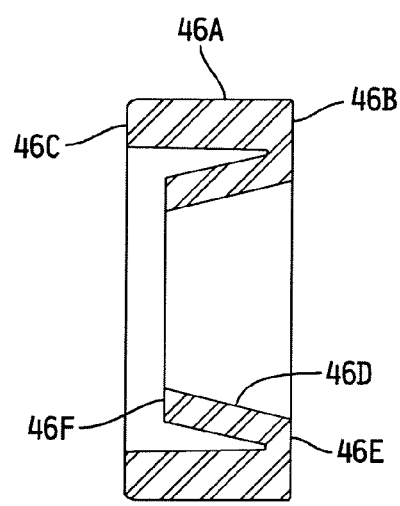
FIG. 3A
FIG. 3B

HERMETICALLY SEALED LOCKING RETRACTOR

CROSS REFERENCE TO RELATED APPLICATIONS

This application is the U.S. national phase of PCT/US2012/027444 filed Mar. 2, 2012. PCT/US2012/027444 claims the benefit of U.S. provisional patent application Ser. No. 61/448,262 filed Mar. 2, 2011, the disclosures of which are both expressly incorporated herein by reference.

FIELD OF THE INVENTION

The present invention relates generally to locking retractors, and more specifically to apparatuses and methods for hermetically sealing locking components of such retractors.

BACKGROUND

Locking retractors are known, and operate to lock under various operating conditions to prevent movement of a web attached thereto. For example, an automatic locking retractor (ALR) may operate to automatically lock after slack in the web is taken up by the retractor following pay out of the web, e.g., after attachment of the web to another structure such as a tongue or buckle. An emergency locking retractor (ELR), on the other hand, may lock only under certain emergency conditions such as during rapid deceleration and/or vehicle impact. Conventional embodiments of such retractors are susceptible to the ingress of moisture and particulate matter into the locking components, which could compromise the locking operation of such locking components. It is therefore desirable to provide a retractor in which the locking components are sealed from moisture and particulate matter ingress.

SUMMARY

The present invention may comprise one or more of the features recited in the attached claims, and/or one or more of the following features and combinations thereof. A method is provided for hermetically sealing locking components of a retractor, wherein the locking components cooperate with a spool shaft extending from a rotatable spool of the retractor to selectively lock rotation of the spool. The method may comprise mounting a base of an open-ended housing to the retractor, wherein the housing may define a first opening through the base into an interior of the housing, and the spool shaft is accessible via the first opening when the base of the housing is mounted to the retractor, positioning a first sealing member about the first opening such that the first sealing member forms a hermetic seal between the spool shaft and the first opening, operatively arranging the locking components within the interior of the housing, and hermetically sealing a cover to the open end of the housing after the housing is mounted to the retractor, the first sealing member is positioned about the first opening and the locking components are operatively arranged within the interior of the housing.

The foregoing method may further include the subject matter of any one and/or any combination of the following 11 paragraphs.

Positioning the first sealing member about the first opening may comprise positioning the first sealing member such that the first sealing member engages the housing about the first opening and also engages the spool shaft circumferentially about the spool shaft when the housing is mounted to the retractor such that the first sealing member forms the hermetic seal between the first opening of the housing and the spool shaft.

The housing may define a channel extending into the base of the housing about the first opening, the channel sized to receive and retain therein the first sealing member, and positioning the first sealing member about the first opening may comprise inserting the first sealing member into the channel.

The retractor may comprise a frame defining a frame sidewall through which the spool shaft extends, and mounting the base of the open-ended housing to the retractor may comprise mounting the base of the open-ended housing to the frame sidewall with an exterior surface of the base opposite to the interior of the housing in contact with the frame sidewall.

The frame sidewall and the base of the open-ended housing may each define at least one mounting aperture therethrough and the cover defines at least one mounting aperture therein, and mounting the base of the open-ended housing to the retractor may comprise passing at least one fixation member through the at least one mounting aperture defined through the frame sidewall and through the at least one mounting aperture defined through the base of the open-ended housing and securing the at least one fixation element within the at least one mounting aperture defined in the cover to thereby secure the housing and the cover, with the locking components operatively arranged within the interior of the housing, to the frame sidewall of the retractor.

Mounting the base of the open-ended housing to the retractor may comprise affixing the exterior surface of the base of the housing to the frame sidewall.

Affixing the exterior surface of the base of the housing to the frame sidewall may comprise interposing a bonding medium between and in contact with the exterior surface of the base of the housing and the frame sidewall.

The retractor may include a locking bar movably mounted to the frame sidewall and engageable with the spool to lock rotation of the spool relative to the frame sidewall, and wherein the locking components control a position of the locking bar to selectively lock the spool relative to the frame sidewall. The housing may define a second opening, separate from the first opening, through the base, and one end of the locking bar may be accessible via the second opening when the base of the housing is mounted to the retractor. The method may further comprise positioning a second sealing member about the second opening, and mounting one of the locking components to the one end of the locking bar such that the second sealing member forms a hermetic seal between the one of the locking components and the second opening. Hermetically sealing a cover to the open end of the housing may comprise hermetically sealing the cover to the open end of the housing after the housing is mounted to the retractor, the first sealing member is positioned about the first opening, the second sealing member is positioned about the second opening, the one of the locking components is mounted to the one end of the locking bar through the second opening and remaining ones of the locking components are operatively arranged within the interior of the housing.

Positioning the second sealing member about the second opening may comprise positioning the second sealing member such that the second sealing member engages the housing about the second opening and also engages the one of the locking components when the one of the locking components is mounted to the one end of the locking bar through the second opening such that the second sealing member forms the hermetic seal between the second opening of the housing and the one of the locking components.

The housing may define a channel extending into the base of the housing about the second opening, the channel sized to receive and retain therein the second sealing member, and positioning the second sealing member about the second opening may comprise inserting the second sealing member into the channel.

The open-ended housing may comprise a housing sidewall extending from the base about an outer perimeter of the housing such that the interior of the housing is defined between the base of the housing and the housing sidewall, a free end of the housing sidewall defining one of a channel and a lip. The cover may comprise a cover sidewall extending about an outer perimeter thereof, a free end of the cover sidewall defining the other of a channel and a lip configured complementarily to the one of the channel and the lip defined by the housing sidewall. Hermetically sealing the cover to the open end of the housing may comprise bringing the one of the channel and the lip of the housing sidewall into contact with the other of the channel and the lip of the cover, and hermetically sealing the free end of the cover sidewall to the free end of the housing sidewall such that the lip forms a hermetic seal with the channel.

Hermetically sealing the free end of the cover sidewall to the free end of the housing sidewall may comprise ultrasonically welding the free end of the cover sidewall to the free end of the housing sidewall.

An apparatus is provided for hermetically sealing locking components of a retractor, wherein the locking components cooperate with a spool shaft extending from a rotatable spool of the retractor to selectively lock rotation of the spool. The apparatus may comprise an open-ended housing having a base defining a first opening therethrough into an interior of the housing, the base of the housing mounted to the retractor with the spool shaft accessible via the first opening, the locking components arranged within the interior of the housing, a first sealing member positioned about the first opening to form a hermetic seal between the spool shaft and the first opening, and a cover hermetically attached to the open end of the housing.

The foregoing apparatus may further include the subject matter of any one and/or any combination of the following 8 paragraphs.

The housing and the cover may each be formed of a polymer.

The locking components may be configured to cooperate with the spool to form at least one of an emergency locking retractor and an automatic locking retractor.

The housing may define a first channel extending into the base of the housing about the first opening, the first channel sized to receive and retain therein the first sealing member. The first sealing member may be positioned within the first channel such that the first sealing member engages the housing about the first opening and also engages the spool shaft about the spool shaft when the housing is mounted to the retractor, the first sealing member thereby forming the hermetic seal between the first opening of the housing and the spool shaft.

The first channel may extend into one of an inner surface and an outer surface of the base of the housing about the first opening.

The retractor may further include a frame sidewall through which the spool shaft extends and to which the base of the housing is mounted, and a locking bar movably mounted to the frame sidewall and engageable with the spool to lock rotation of the spool relative to the frame sidewall, and the locking components may control a position of the locking bar to selectively lock the spool relative to the frame sidewall. The base of the housing may further define a second opening therethrough, separate from the first opening, such that one end of the locking bar is accessible through the second opening when the base of the housing is mounted to the frame sidewall, and one of the locking components may be mounted to the one end of the locking bar, and wherein the apparatus further comprises a second sealing member positioned about the second opening such that the second sealing member forms a hermetic seal between the one of the locking components and the second opening.

The housing may define a second channel extending into the base of the housing about the second opening, the second channel sized to receive and retain therein the second sealing member, and the second sealing member may be positioned within the second channel such that the second sealing member engages the housing about the second opening and also engages the one of the locking components mounted to the one end of the locking bar when the housing is mounted to the retractor, the second sealing member thereby forming the hermetic seal between the second opening of the housing and the one of the locking components.

The second channel may extend into one of an inner surface and an outer surface of the base of the housing about the second opening.

The locking components may be configured to cooperate with the spool and with the locking bar to form at least one of an emergency locking retractor and an automatic locking retractor.

A locking retractor may comprise a frame defining two opposing sidewalls, a spool extending between the two sidewalls and rotatable about a spool shaft relative to the frame, one end of the spool shaft extending through one of the sidewalls, an open-ended housing having a base defining a first opening therethrough into an interior of the housing, the base of the housing mounted to the one of the sidewalls with the spool shaft accessible via the first opening of the open-ended housing, one or more locking components arranged within the interior of the housing, the one or more locking components configured to cooperate with the spool shaft to selectively lock rotation of the spool relative to the frame, a sealing member positioned about the first opening to form a hermetic seal between the spool shaft and the first opening, and a cover hermetically attached to the open end of the housing with the one or more locking components contained within the interior of the housing.

The foregoing retractor may further include the subject matter of any one and/or any combination of the following 4 paragraphs.

The one or more locking components may be configured to cooperate with the spool shaft to form at least one of an emergency locking retractor and an automatic locking retractor.

The retractor may further comprise at least one ratchet wheel mounted to and rotatable with the spool, a locking bar mounted between the two opposing sidewalls of the frame, the locking bar movable relative to the frame between a first position in which the locking bar engages the at least one ratchet wheel and a second position in which the locking bar does not engage the at least one ratchet wheel, one end of the locking bar extending through the one of the sidewalls, wherein the base of the open-ended housing defines a second opening therethrough separate from the first opening, and the one end of the locking bar is accessible via the second opening, and wherein one of the one or more locking components is mounted to the one end of the locking bar, and a second sealing member positioned about the second opening such that the second sealing member forms a hermetic seal between the one of the one or more locking components and the second opening, wherein the one or more locking components control the locking bar between the first and second positions thereof to selectively lock the spool relative to the frame sidewall.

The locking components may be configured to cooperate with the spool and with the locking bar to form at least one of an emergency locking retractor and an automatic locking retractor.

The housing and the cover may each be formed of a polymer.

BRIEF DESCRIPTION OF THE DRAWINGS

FIG. 3A is a plan view of one of the sealing members of the apparatus shown in FIGS. 1 and 2.

FIG. 3B is a cross-section of the sealing member of FIG. 3A viewed along section lines 3B-3B.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
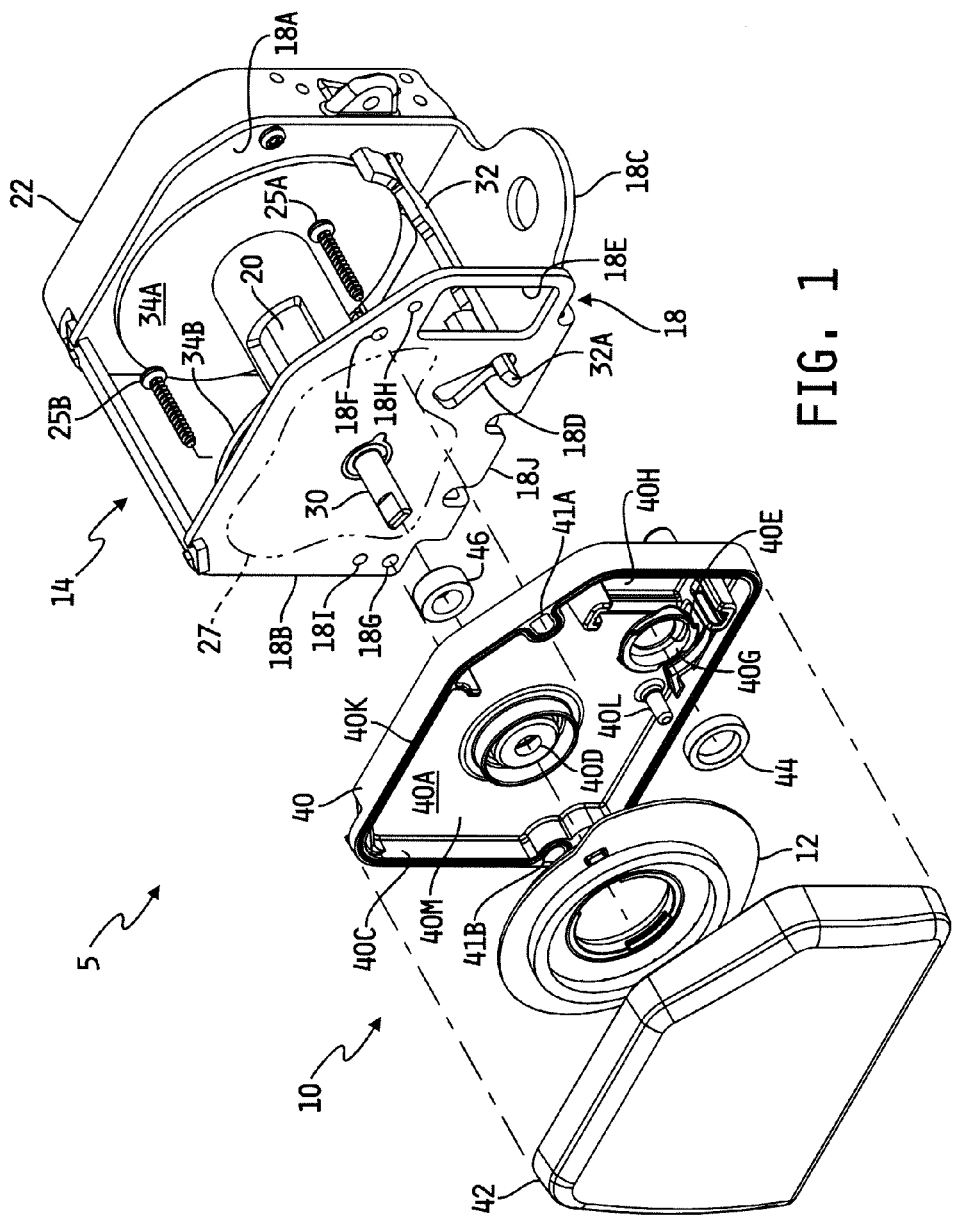
FIG. 1 is a perspective and partial assembly view of one illustrative embodiment of an apparatus for hermetically sealing locking components of a locking retractor.

Referring now to FIG. 1, an apparatus 10 is illustrated for hermetically sealing locking components 12 of a retractor 14 to produce a hermetically sealed locking retractor 5. The locking components 12 may include one or more locking components, and the locking components 12 make up a spool locking apparatus or assembly. As used herein, the terms "locking components," "spool locking apparatus" and "spool locking assembly" may be used interchangeably and each such term refers to the one or more locking components 12 which operate to lock rotation of the spool 20 under certain operating conditions of the retractor 5. In one embodiment, for example, as will be shown and described in detail hereinafter, the spool locking apparatus 12 illustratively includes one or more locking components that lock rotation of the spool 20 under one or more "emergency conditions" such that the resulting hermetically sealed locking retractor 5 is, in such embodiments, a so-called conventional emergency locking retractor or ELR. In other embodiments, the spool locking apparatus 12 illustratively includes one or more locking components that automatically lock rotation of the spool 20 under one or more "non-emergency conditions" such that the resulting hermetically sealed locking retractor 5 is, in such embodiments, a so-called automatic locking retractor or ALR. In still other embodiments, the spool locking apparatus 12 illustratively includes one or more locking components that automatically lock rotation of the spool 20 under one or more non-emergency conditions and one or more locking components that lock rotation of the spool 20 under one or more emergency conditions such that the resulting hermetically sealed locking retractor 5 is, in such embodiments, a combination ALR and ELR.

The "emergency conditions" under which the one or more locking components lock rotation of the spool 20 may include, but are not limited to, one or more of (1) one or more orientations of the retractor 5 relative to the direction of gravity, i.e., relative to earth, (2) when the rotational speed of the spool 20 exceeds a threshold speed, i.e., inertial locking, and (3) when the retractor 5 decelerates at a rate that is greater than a deceleration threshold, e.g., during a vehicle crash. The "non-emergency conditions" under which the one or more locking components lock rotation of the spool 20 may include, but are not limited to, automatically locking the spool at a set position of the spool 20, e.g., after the spool 20 has traveled a distance in the web payout direction that corresponds to, for example, extension of a predetermined length of web from the retractor. In some embodiments, the spool 20 may thereafter rotate in the web take-up direction to a desired position, e.g., to a desired position of the web, such that the spool 20 locks at that desired position and thereafter cannot rotate in the web payout direction.

For clarity of illustration, the spool locking apparatus 12 is illustrated in FIG. 1 as a single generic structure, although it will be understood that depending upon the configuration of the spool locking apparatus 12, i.e., as between an ELR, an ALR or both, the spool locking apparatus 12 may be implemented an assembly that includes a plurality of locking components. Alternatively or additionally, depending upon the configuration of the retractor 14 with which the spool locking apparatus 12 interfaces, the spool locking apparatus 12 may be configured to operatively engage one or multiple components of the retractor 14.

In the embodiment illustrated in FIG. 1, the retractor 14 includes a frame 18 having a pair of sidewalls 18A and 18B that extend away from a base 18C of the frame 18. Illustratively, the sidewalls 18A and 18B are substantially parallel. In any case, a space is defined between the sidewalls 18A and 18B and a spool 20 is rotatably mounted between the sidewalls 18A and 18B in a conventional manner. One end of a conventional flexible web (not shown) will typically be attached to the spool 20, and such a web will be wrapped around the spool 20 in a conventional manner. A free end (not shown) of the web will generally extend from the retractor 14, and an engagement member (not shown), e.g., a hook or other conventional engagement member, may be attached to the free end of the web. A conventional power spring assembly 22, e.g., a power spring contained within a housing or cover, is attached between the spool 20 and the sidewall 18A of the frame 18. The power spring is configured in a conventional manner to apply a rotational biasing force to the spool 20 in a web take up direction, which rotational biasing force may be manually overcome when the retractor 14 is not locked by the locking components 12 from rotating the spool 20 in an opposite web payout direction to draw web from the spool 20. The hermetically sealing apparatus 10 including the spool locking apparatus 12 contained therein is illustratively mounted to the opposite sidewall 18B, and the spool locking apparatus 12 is therefore illustratively hermetically sealed by the apparatus 10 as will be described in greater detail hereinafter. Hermetic sealing of the locking components 12 by the apparatus 10 blocks ingress of moisture and particles to the locking components 12 such that the locking components 12 are maintained functional during exposure of the retractor 5 to harsh environments such as, for example, dust, dirt and mud, and including full or partial immersion of the retractor 5 in water that may include various amounts of dirt or mud, e.g., ponds, lakes, streams, ditches, puddles, etc.

A spool shaft 30 is rigidly mounted to the spool 20 such that the shaft 30 rotates with the spool 20. The spool shaft 30 extends through the sidewall 18B of the frame 18 and extends outwardly away from the sidewall 18B as shown in FIG. 1. In the embodiment of the retractor 14 illustrated in FIG. 1, a conventional locking bar 32 is movably mounted to and between the sidewalls 18A and 18B, and one end 32A of the locking bar 32 extends through an opening 18D in the sidewall 18B and at least partially extends outwardly away from the sidewall 18B. The locking bar 32 is conventional and is normally biased, e.g., via a spring (not shown) attached between the locking bar 32 and the frame 18, away from the spool 20 so that the spool 20 may rotate in either of the web take up or web pay out directions. When the retractor 14 is locked, e.g., via the locking components 12, the locking bar 32 is forced toward the spool 20 and engages teeth (not shown) formed on at least one ratchet wheel mounted to the spool 20. In the illustrated embodiment, two such ratchet wheels 34A and 34B are mounted to the spool 20 at opposite ends thereof. In the illustrated embodiment, the locking bar 32 engages the teeth of the ratchet wheels 34A and 34B when the retractor 14 is locked, thereby preventing rotational movement of the spool 20 in the web payout direction in a conventional manner.

Figure 2:
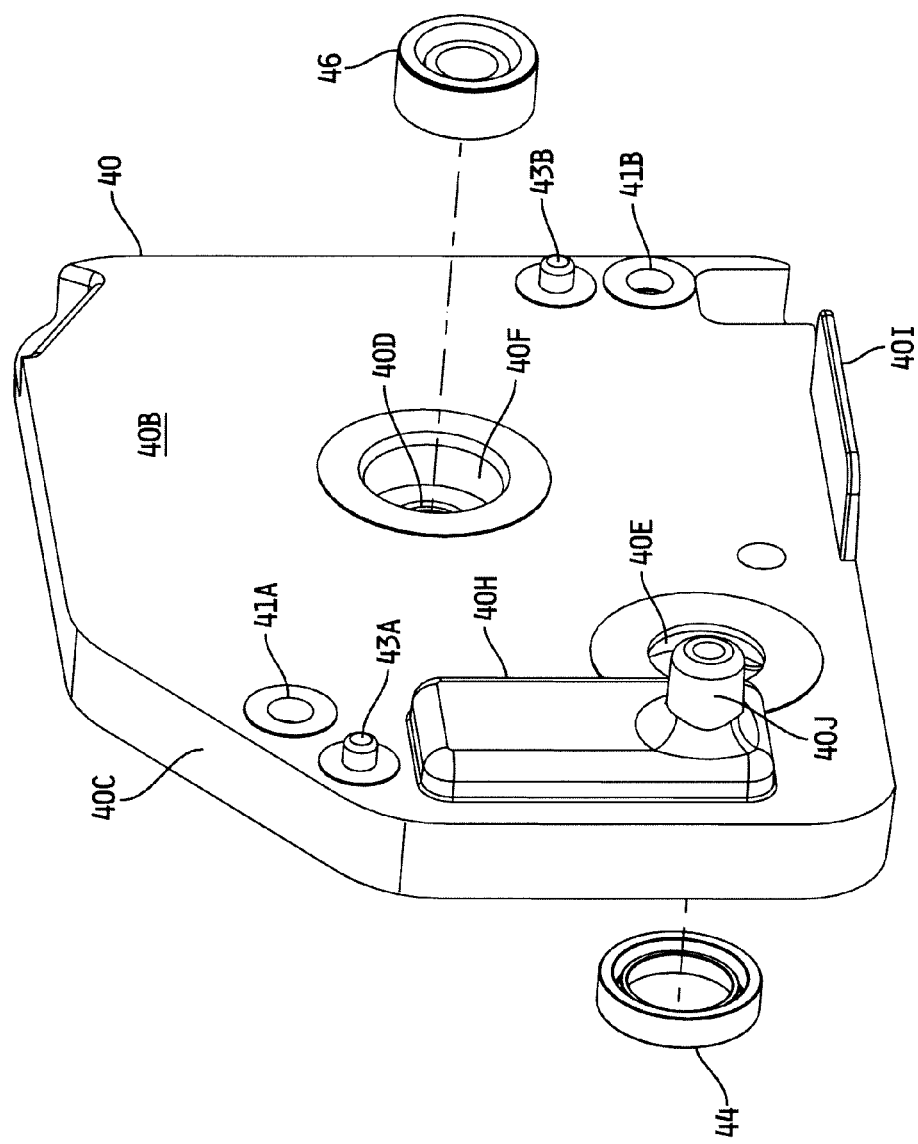
FIG. 2 is a perspective view of the bottom or backside of the housing of FIG. 1 illustrating partial assembly of the apparatus shown in FIG. 1.

In the embodiment illustrated in FIG. 1, the apparatus 10 for hermetically sealing locking components 12 of the retractor 5 includes a housing 40, housing cover 42 and two sealing members 44 and 46. Referring now to FIGS. 1 and 2, the housing 40 is illustratively an open-ended housing having a base 40M defining an inner surface 40A and an outer surface 40B opposite the inner surface 40A. A housing sidewall 40C extends outwardly away from the inner surface 40A of the base 40M about an outer periphery of the housing 40. The base 40M of the housing 40 defines two separate openings 40D and 40E respectively therethrough, and a pocket 40H sized to receive a locking actuator component of the spool locking apparatus 12 as will be illustrated and described hereinafter. The opening 40D is sized to receive therethrough the spool shaft 30 and the second opening 40E is sized to provide access to the end 32A of the locking bar 32 when the outer surface 40B of the base 40M of the housing 40 is mounted to the sidewall 18B of the frame 18. The housing 40 is configured such that the openings 40D and 40E align with the spool shaft 30 and the end 32A of the locking bar 32 respectively when the base 40M of the housing 40 is mounted to the sidewall 18B.

As illustrated by example in FIGS. 1 and 2, the sidewall 18B of the frame 18 and/or the base 40M of the housing 40 may be configured to accommodate mounting to the other. Such configuration may, for example, facilitate alignment of the housing 40 relative to the sidewall 18B, facilitate mounting of the housing 40 to the sidewall 18B and/or accommodate one or more features of the housing 40 and/or sidewall 18B. For example, the pocket 40H formed in the base 40M and extending into the inner surface 40A produces a protrusion 40H from the outer surface 40B, and a window 18E is therefore formed through the sidewall 18B of the frame 18 which is sized to receive the pocket 40H therein. A fastening site 40J is also illustratively formed on the pocket 40H on the outer surface 40B of the housing 40, and the fastening site 40J is sized to receive therein a fixation member such that an optional cover (not shown) may be placed over the window 18E on the inside surface of the sidewall 18B and fixed in place via such a fixation member.

The housing 40 may further include a plate 40I which extends from the outer surface 40B of the base 40M of the hosing 40, which plate 40I may extend under an indented portion 18J of the frame 18 between the sidewall 18B and the base 18C. The housing 40 may further include protrusions 43A and 43B which extend outwardly from the outer or bottom surface 40B of the housing 40, and the sidewall 18B may define a corresponding pair of openings 18H and 18I therethrough which are sized to receive therein the protrusions 43A and 43B respectively. Alternatively, either or both of the protrusions may be formed on the sidewall 18B and either or both corresponding openings may be formed into, but not through, the outer surface 40B of the housing 40.

Generally, the base 40M of the housing 40 is mounted to the retractor 14, and more specifically the base 40M of the housing 40 is illustratively mounted to the sidewall 18B of the frame 18 with the outer surface 40B of the base 40M in contact with the outer face of the sidewall 18B. In the embodiment shown in FIGS. 1 and 2, this mounting is illustratively accomplished by passing one or more fixation members through the sidewall 18B, through openings defined through the housing 40 and into engagement with the cover 42. In the illustrated example, two openings 18F and 18G are defined through the sidewall 18B of the frame 18, and corresponding openings 41A and 41B are defined through the base 40M of the housing. As illustrated in FIGS. 1, 4A-4B, 7, 9 and 10, however, the openings 41A and 41B are formed outside of the interior of the open-ended housing, which interior is defined and bounded by the inner surface 40A of the base 40A and a continuous inner surface of the sidewall 40C which extends about the periphery of the housing 40. Then openings 41A and 41B defined through the housing 40 therefore do not extend through the base 40M into the interior of the housing 40, but rather extend through the base 40M of the housing 40 outside of the interior of the housing 40.

Figure 10:
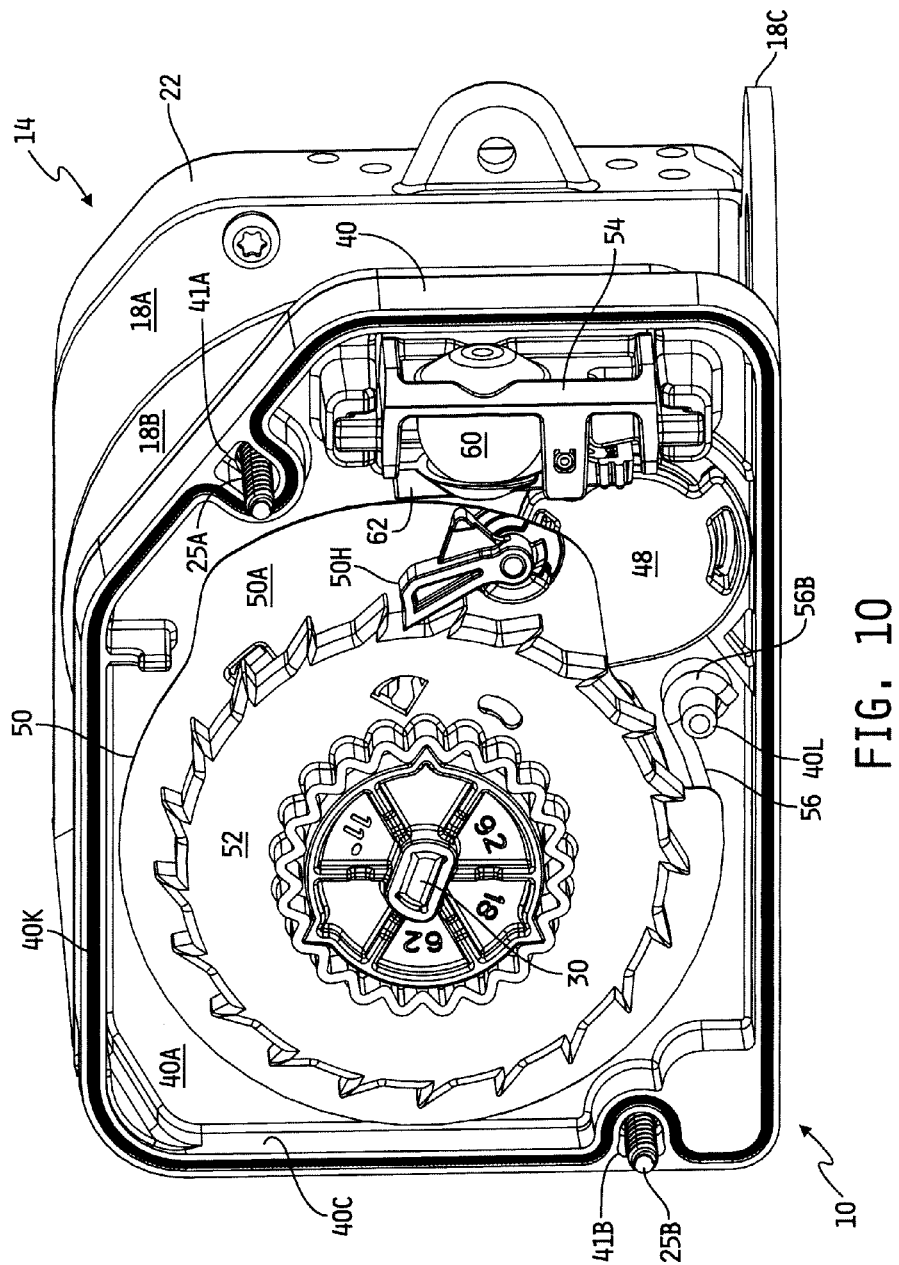
FIG. 10 is a perspective view of the apparatus shown with the clutch wheel 52 mounted to the locking plate of FIG. 9 and with the locking actuator 54 mounted within the housing of the apparatus.
Figure 11:
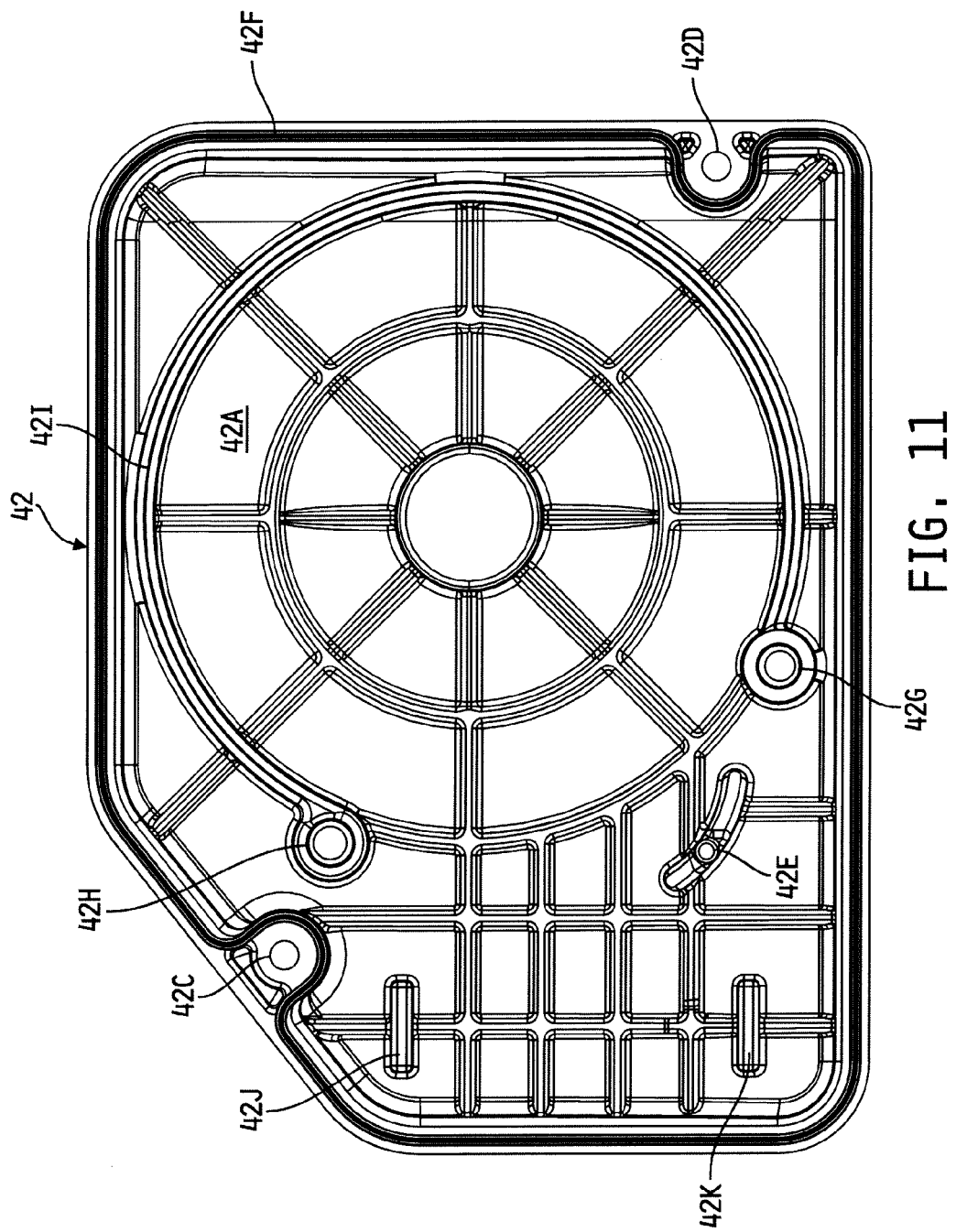
FIG. 11 is a plan view of the inside surface of the cover illustrated in FIG.

In any case, the inside surface of the cover 42 defines two fastening sites (or mounting apertures) 42C and 42D as illustrated by example in FIG. 11. Each of the sites 42C and 42D is configured to receive and engage a corresponding one of two fixation members 25A and 25B. When the housing 40 is mounted to the retractor 14 with the outer surface 40B of the base 40M in contact with the outer surface of the frame sidewall 18B as illustrated in FIG. 1, the openings 41A and 41B align with the openings 18F and 18G respectively, and the fixation members 25A and 25B extend through the aligned opening pairs 18F, 41A and 18G, 41B respectively (as clearly illustrated in FIG. 10). After the locking components of the spool locking apparatus 12 are operatively arranged within the interior of the housing 40, the cover 42 is placed over the open end of the housing 40 such that the fastening sites 42C and 42D align with the openings 41A and 41B (and with the fixation members 25A and 25B) respectively. The fixation members 25A and 25B are then manipulated to engage the fastening sites 42C and 42D respectively to thereby mount the combination of the housing 40 and the cover 42, with the spool locking apparatus 12 contained therebetween, to the retractor 14, i.e., to the frame sidewall 18B. Illustratively, the housing 40 and the cover 42 are formed by a moldable synthetic or semi-synthetic organic solid material such as a polymer or similar material, although this disclosure contemplates that the housing 40 and/or cover 42 may be alternatively formed of one or more additional or other materials.

It will be understood that this disclosure contemplates mounting of the housing 40 to the frame 18 of the retractor 14 using one or more additional or alternative, conventional techniques. As one alternative, or in addition, to the mounting of the housing 40 to the frame sidewall 18B as just described, a bonding medium 27 may be interposed between and in contact with the outer surface 40B of the housing 40 and the outer surface of the frame sidewall 18B as illustrated by dashed-line representation in FIG. 1. The bonding medium 27 may be any conventional medium which creates a bond between the base 40M of the housing 40 and the frame sidewall 18B, examples of which include, but should not be limited to, adhesives, resins, and the like. As another alternative, or in addition, to the mounting of the housing 40 to the frame sidewall 18B as just described and/or to use of a bonding medium 27, the housing 40 may be mounted to the frame sidewall 18B using a conventional staking process. In such a process, the protrusions 43A and/or 43B, and/or one or more additional or alternate protrusions formed on or attached to the outer surface 40B of the housing 40 may be sized and/or configured to be staked to corresponding openings, e.g., openings 18H and/or 18I and/or one or more additional or alternate openings formed in the frame sidewall 18B, to thereby secure the housing 40 to the frame sidewall 18B. One or more conventional mounting structures and/or processes may additionally or alternatively be used to mount the housing 40 to the frame 18 of the retractor 14, and any such structures and/or processes are contemplated by this disclosure.

Referring still to FIGS. 1 and 2, the sealing member 46 is positioned about the opening 40D defined through the base 40M of the housing 40. The sealing member 46 is illustratively configured to extend about and engage the periphery of the opening 40D and to extend about and engage the periphery of the spool shaft 30 when the base 40M of the housing 40 is mounted to the sidewall 18B of the frame 18 such that a hermetic seal is formed between the housing 40 and the spool shaft 30. In one embodiment, the sealing member 46 is illustratively a conventional, flexible, e.g., rubber, polymer or the like, annular member. Referring to FIGS. 3A and 3B, plan and cross-sectional views respectively are shown of one illustrative embodiment of the sealing member 46. In the illustrated embodiment, the sealing member 46 is a double ring structure with an outer annular ring 46A coupled to an inner ring 46D. One end 46B of the outer annular ring 46A is coextensive with one end 46E of the inner annular ring 46D such that the ends 46B and 46E form a continuous, common, flat surface. The opposite end 46C of the outer annular ring 46A extends beyond the opposite end 46F of the inner annular ring 46D to provide an offset between the flat ends 46C and 46F of the annular rings 46A and 46D respectively. In alternative embodiments, the sealing member 46 may be a single annular sealing member, or a conventional quad ring, which may be flexible or semi-flexible, although this disclosure contemplates alternative embodiments in which the sealing member 46 is non-annular, non-flexible and/or is formed of one or more additional or alternative materials.

Referring specifically to FIG. 2, the opening 40D formed through the base 40M of the housing 40 includes a channel 40F defined and extending into the outer surface 40B of the base 40M of the housing 40, and formed about the periphery of the opening 40D. The channel 40F is illustratively sized to receive and retain therein the sealing member 46. In alternative embodiments, the channel 40F may be defined in the inner surface 40A surface of the base 40M of the housing 40 about the periphery of the opening 40D, or may be formed into the periphery of the opening 40D. In any case, the sealing member 46 is illustratively inserted into the channel 40F with the common, flat ends 46B and 46E in contact with the bottom of the channel 40F and with the offset ends 46C and 46F facing outwardly away from the channel 40F.

Figure 4A:
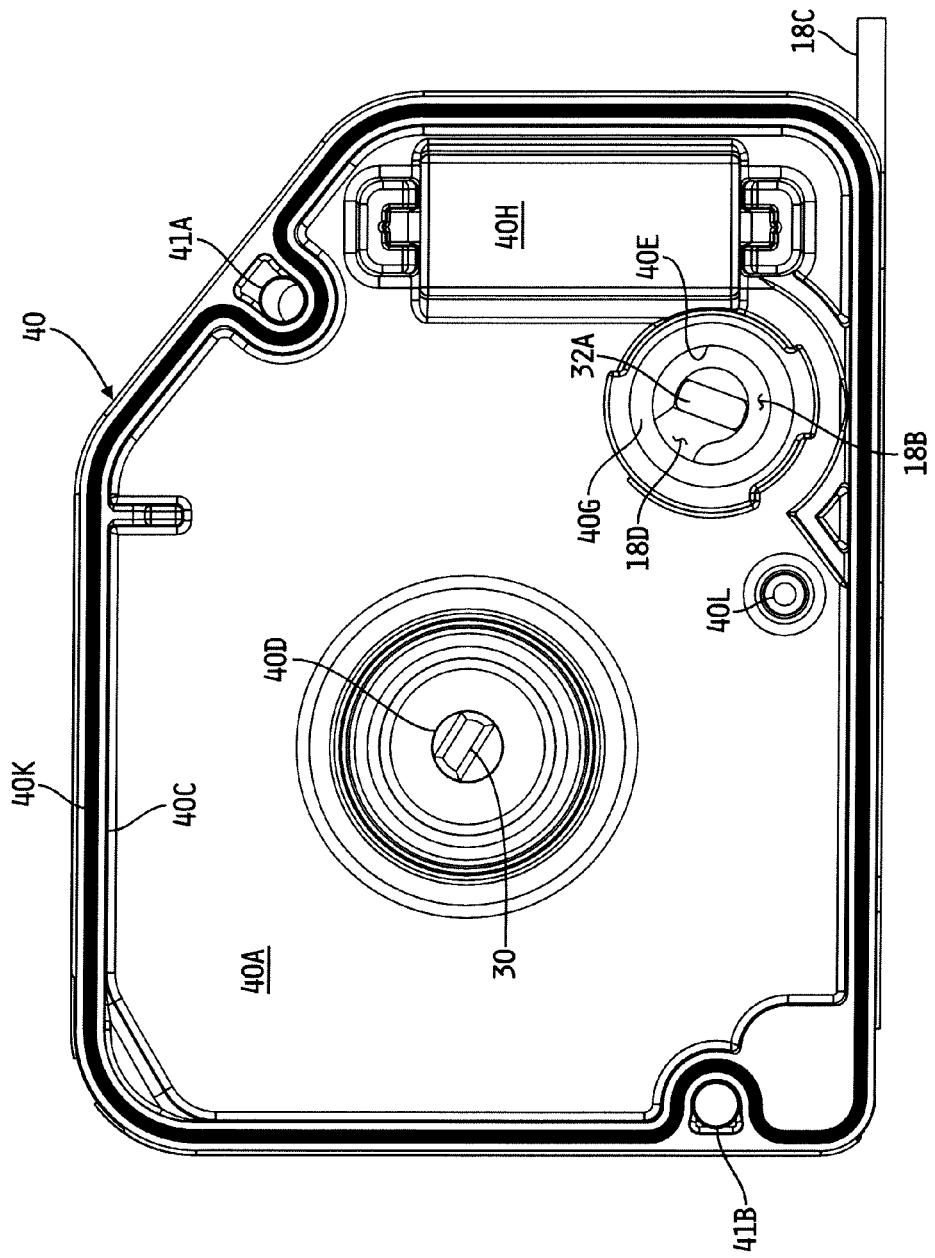
FIG. 4A is a plan view of the housing of FIGS. 1 and 2 mounted to one of the sidewalls of the frame of the retractor illustrated in FIG. 1.
Figure 4B:
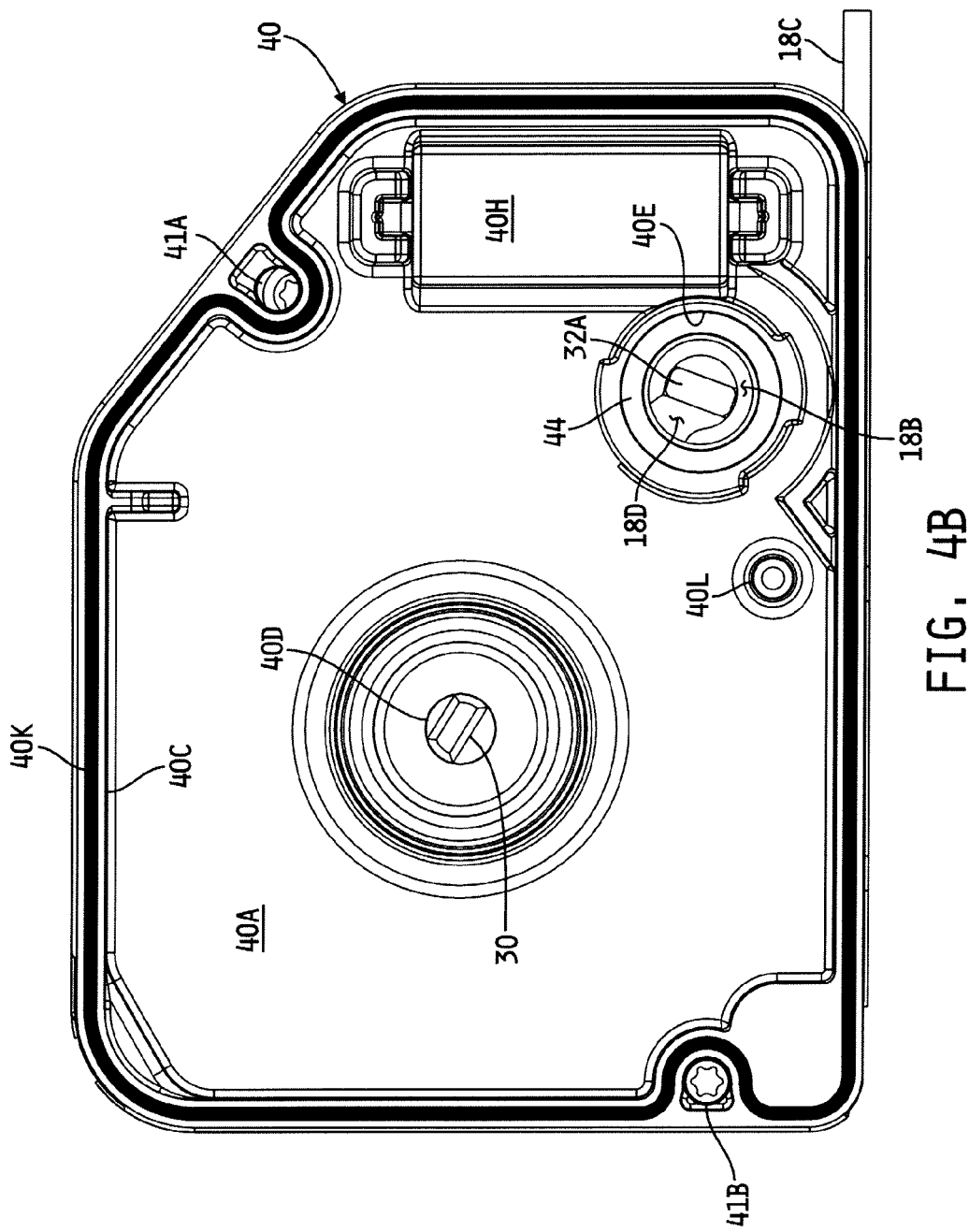
FIG. 4B is a plan view similar to FIG. 4A shown with a sealing member positioned in a channel of the housing about the end of the locking bar of the retractor.

Referring now to FIGS. 1, 2, 4A and 4B, the sealing member 44 is positioned about the opening 40E defined through the base 40M of the housing 40. The sealing member 44 is illustratively configured to extend about and engage the periphery of the opening 40E and to extend about, but not engage, the periphery of the end 32A of the locking bar 32 when the housing 40 is mounted to the sidewall 18B of the frame 18. In one embodiment, the sealing member 44 is illustratively a conventional, flexible, e.g., rubber, polymer or the like, annular member substantially identical in structure to, but sized differently than, the sealing member 46. Alternatively, the sealing member 44 may be a single annular sealing member, or a conventional quad ring, and may be flexible or semi-flexible, although this disclosure contemplates alternative embodiments in which the sealing member 44 is non-annular, non-flexible and/or is formed of one or more additional or alternative materials. In the illustrated embodiment, the opening 40E includes a channel 40G defined in the inner surface 40A of the base 40M of the housing 40 and formed about the periphery of the opening 40E. The channel 40G is illustratively sized to receive and retain therein the sealing member 44. In alternative embodiments, the channel 40G may be defined in the outer surface 40B surface of the base 40M of the housing 40 about the periphery of the opening 40E, or may be formed into the periphery of the opening 40E. In any case, the opening 40E through the base 40M of the housing 40 is aligned with and extends about the end 32A of the locking bar 32 when the base 40D of the housing 40 is mounted to the frame sidewall 18B as illustrated in FIG. 4A. As illustrated in FIG. 4B, the sealing member 44 is illustratively inserted into the channel 40G with the offset end of the outer ring in contact with the bottom of the channel 40G (as shown in FIG. 2) and with the common, flat ends of the inner and outer annular rings facing outwardly away from the channel 40G (as shown in FIGS. 1, 4A and 4B).

With the base 40M of the housing 40 mounted to the frame sidewall 18Bb as shown in FIGS. 1, 4A and 4B, the spool shaft 30 illustratively extends through the opening 40D defined through the base 40M of the housing 40 and into the interior of the housing defined and bounded by the inner surface 40A of the base 40M and the inner surface of the sidewall 40C of the housing 40. In alternative embodiments, the spool shaft 30 may not extend completely through the opening 40D into the interior of the housing 40 but may instead terminate at or below the point at which the opening 40D opens into the inner surface 40A of the base 40M of the housing 40. For purposes of this disclosure, the phrase "accessible via" used in relation to the spool shaft 30 and the opening 40D formed through the base 40M of the housing 40 should be interpreted to encompass all such embodiments. In particular, the phrase "the spool shaft accessible via the first opening" should be interpreted to mean (1) that the spool shaft 30 extends into the interior of the housing 40 defined and bounded by the inner surface 40A of the base 40M and the inner surface of the sidewall 40C surrounding the housing 40, (2) that the spool shaft 30 terminates at the point at which the opening 40D opens into the inner surface 40A of the base 40M of the housing 40, or (3) that the spool shaft 30 terminates below the point at which the opening 40D opens into the inner surface 40A of the base 40M of the housing 40.

With the base 40M of the housing 40 mounted to the frame sidewall 18Bb as shown in FIGS. 1, 4A and 4B, the end 32A of the locking bar 32 illustratively extends into the opening 40E defined through the base 40M of the housing 40, but does not clear the top of the channel 40G. In alternative embodiments, the end 32A of the locking bar 32 may not terminate at or below the top of the channel 40G but may instead extend beyond the top of the channel 40G into the interior of the housing 40 defined and bounded by the inner surface 40A of the base 40M and the inner surface of the sidewall 40C surrounding the housing 40. For purposes of this disclosure, the phrase "accessible via" used in relation to the end 32A of the locking bar 32 and the opening 40E formed through the base 40M of the housing 40 should be interpreted to encompass all such embodiments. In particular, the phrase "one end of the locking bar accessible via the second opening" should be interpreted to mean (1) that the end 32A if the locking bar 32A extends into the interior of the housing 40 defined and bounded by the inner surface 40A of the base 40M and the inner surface of the sidewall 40C surrounding the housing 40, (2) that the end 32A of the locking bar 32 terminates at the point at which the opening 40E opens into the inner surface 40A of the base 40M of the housing 40, or (3) that the end 32A of the locking bar 32 terminates below the point at which the opening 40E opens into the inner surface 40A of the base 40M of the housing 40.

Figure 5:
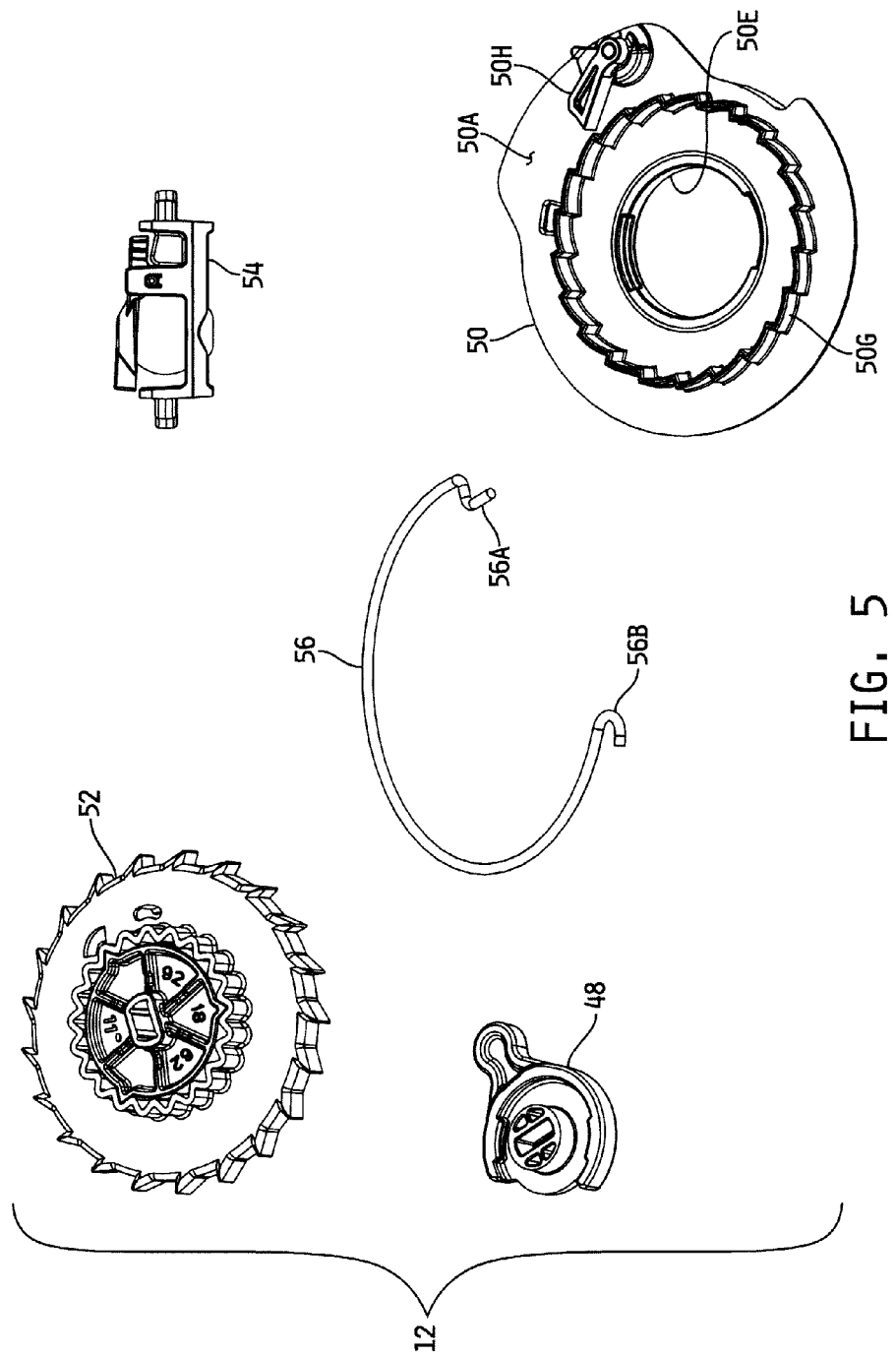
FIG. 5 is an exploded view of the various locking components of one illustrative embodiment of the spool locking assembly illustrated in FIG. 1.

Referring now to FIG. 5, an exploded view is shown of one illustrative embodiment of the spool locking apparatus 12 illustrating various locking components associated therewith. In the illustrated embodiment, the various locking components include a locking bar engagement member 48, a locking plate 50, a clutch wheel 52, a locking actuator 54 and a locking plate biasing member 56. Starting with the partially constructed locking retractor illustrated in FIG. 4B, construction of the spool locking apparatus 12 relative to the retractor 14 illustrated in FIG. 1 using the various locking components illustrated in FIG. 5 will now be described with reference to FIGS. 6-10.

Figure 6:
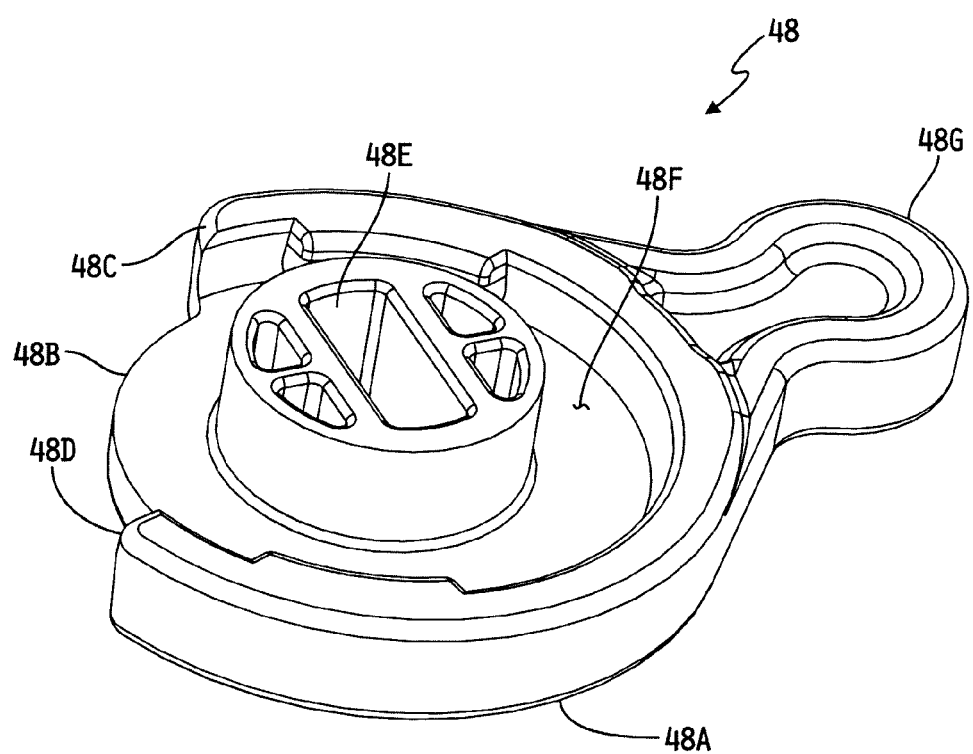
FIG. 6 is a perspective view of the locking bar engaging side of the locking bar engagement member illustrated in FIG. 5.
Figure 7:
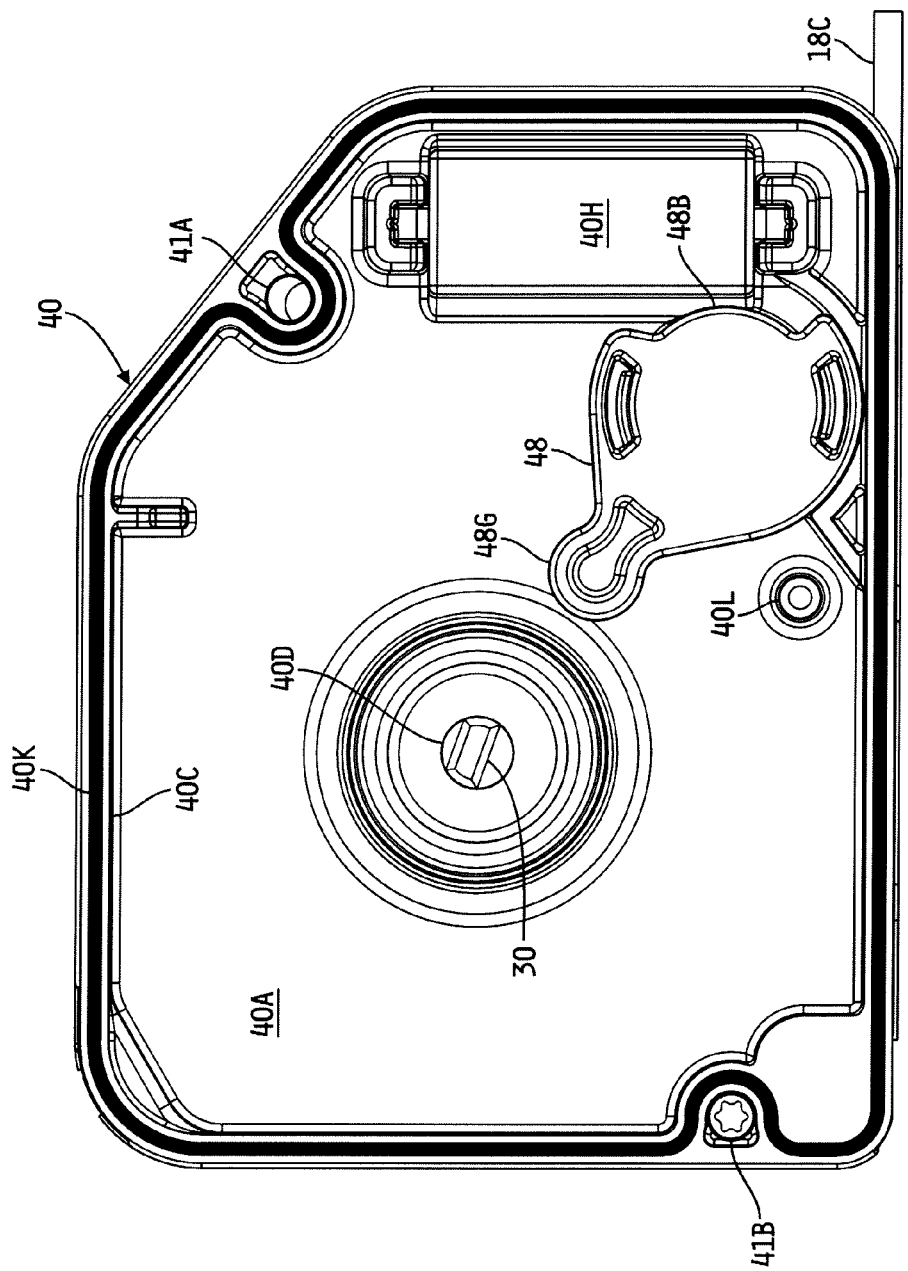
FIG. 7 is a plan view similar to FIG. 4B shown with the locking bar engagement member of FIGS. 5 and 6 mounted to the end of the locking bar illustrated in FIG. 4B.

Referring now to FIG. 6, the locking bar engagement member 48 of FIG. 5 is shown. The locking bar engagement member 48 illustratively includes a base 48A from which a slotted protrusion 48E extends. Illustratively, the base 48A is generally formed in the shape of a truncated disc defining a recessed edge 48B between truncated ends 48C and 48D of the base 48A, and a lobe or arm 48G extends from the base 48A opposite the recessed edge 48B. The base 48A defines an annular channel 48F therein about an outer annular surface of the slotted protrusion 48E. The channel 48F is sized to receive therein in sealing engagement the sealing ring 44 illustrated in FIGS. 1, 2 and 4B. A slot defined in the slotted protrusion 48E is sized and configured to receive therein the end 32A of the locking bar 32 when the base 48A of the locking bar engagement member 48 is mounted within the housing 40 by forcing the slotted protrusion 48E into the space of the opening 40E defined by the inner surface of the sealing ring 44 (as shown in FIG. 4B) with the arm or lobe 48G oriented toward the spool shaft 30 as illustrated by example in FIG. 7. Thus positioned, the sealing ring 44 forms a hermetic seal between the housing 40 and the locking bar engagement member 48, i.e., between the channel 40G defined about the opening 40E in the base 40M of the housing 40 and the channel 48F defined about the slotted protrusion 48E in the base 48A of the locking bar engagement member 48, while also allowing the locking bar engagement member 48 to rotate relative to the base 40M of the housing about the outer surface of the slotted protrusion 48E. The lobe or arm 48G is configured to engage a movable post such that movement of the post causes the locking bar engagement member 48 to rotate relative to the housing 40 and thereby move the locking bar 32 into and out of engagement with the teeth of the ratchet wheels 34A and 34B attached to the spool 20 of the retractor 14 as described hereinabove.

Figure 8:
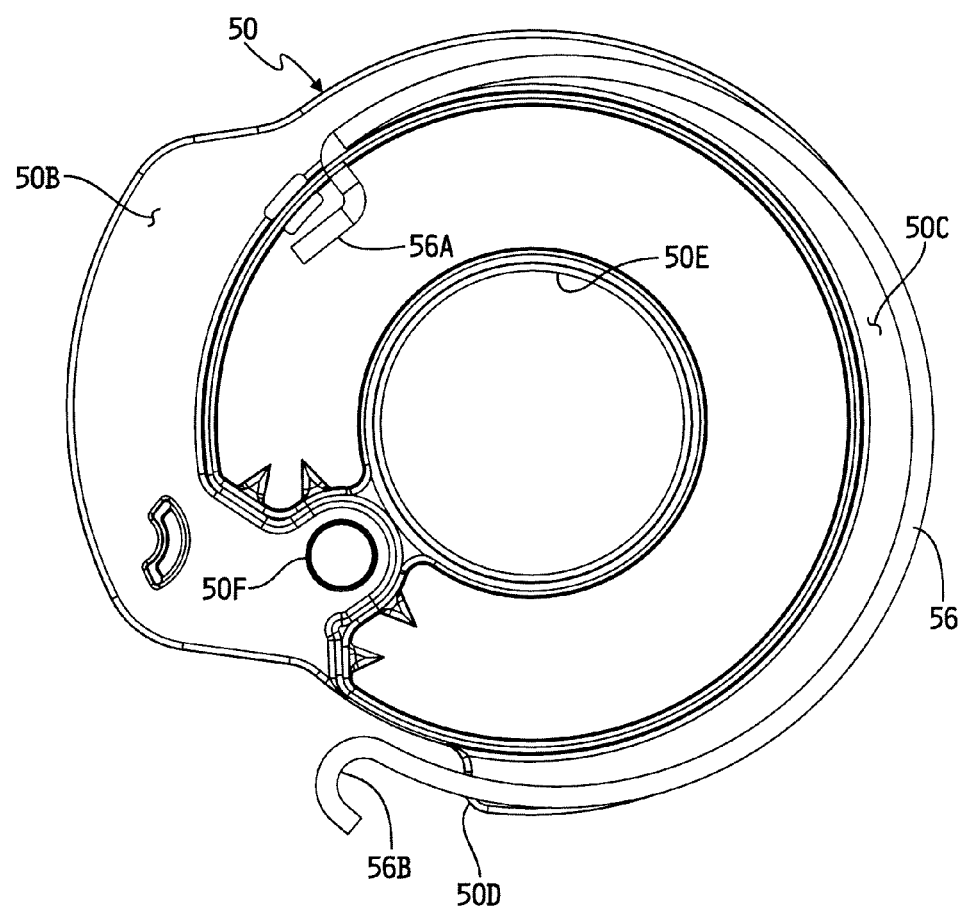
FIG. 8 is a plan view of the bottom or backside of the locking plate illustrated in FIG. 5.

Referring now to FIGS. 5 and 8, one illustrative embodiment of the locking plate 50 is shown. The locking plate 50 illustratively defines a top surface 50A (shown in FIG. 5) and an opposite bottom surface or underside 50B (shown in FIG. 8), and an opening 50E therethrough that is sized to be received over the spool shaft 30 onto the base 40M of the housing 40. The locking plate 50 is configured to be movably mounted to the base 40M of the housing 40 such that the locking plate 50 is generally movable about the spool shaft 30. Referring to FIG. 8, for example, the underside 50B of the locking plate 50 defines therein an annular channel 50C having a channel opening 50D. The biasing member 56 shown in FIG. 5 is illustratively a spring in the form of a single wire having one end 56A that is received through an opening (not shown) defined in the underside 50B of the locking plate 50. The body of the wire 56 is forced into the channel 50C formed in the underside 50B of the locking plate 50, and the hooked opposite end 56B of the wire 56 extends out of the end 50D of the channel 56 as illustrated in FIG. 8. The underside 50B of the locking plate 50 also defines a post 50F that engages and moves the lobe or arm 48G of the locking bar engagement member 48 when the locking plate 50 moves about the spool shaft 30 as will be described in greater detail hereinafter.

Figure 9:
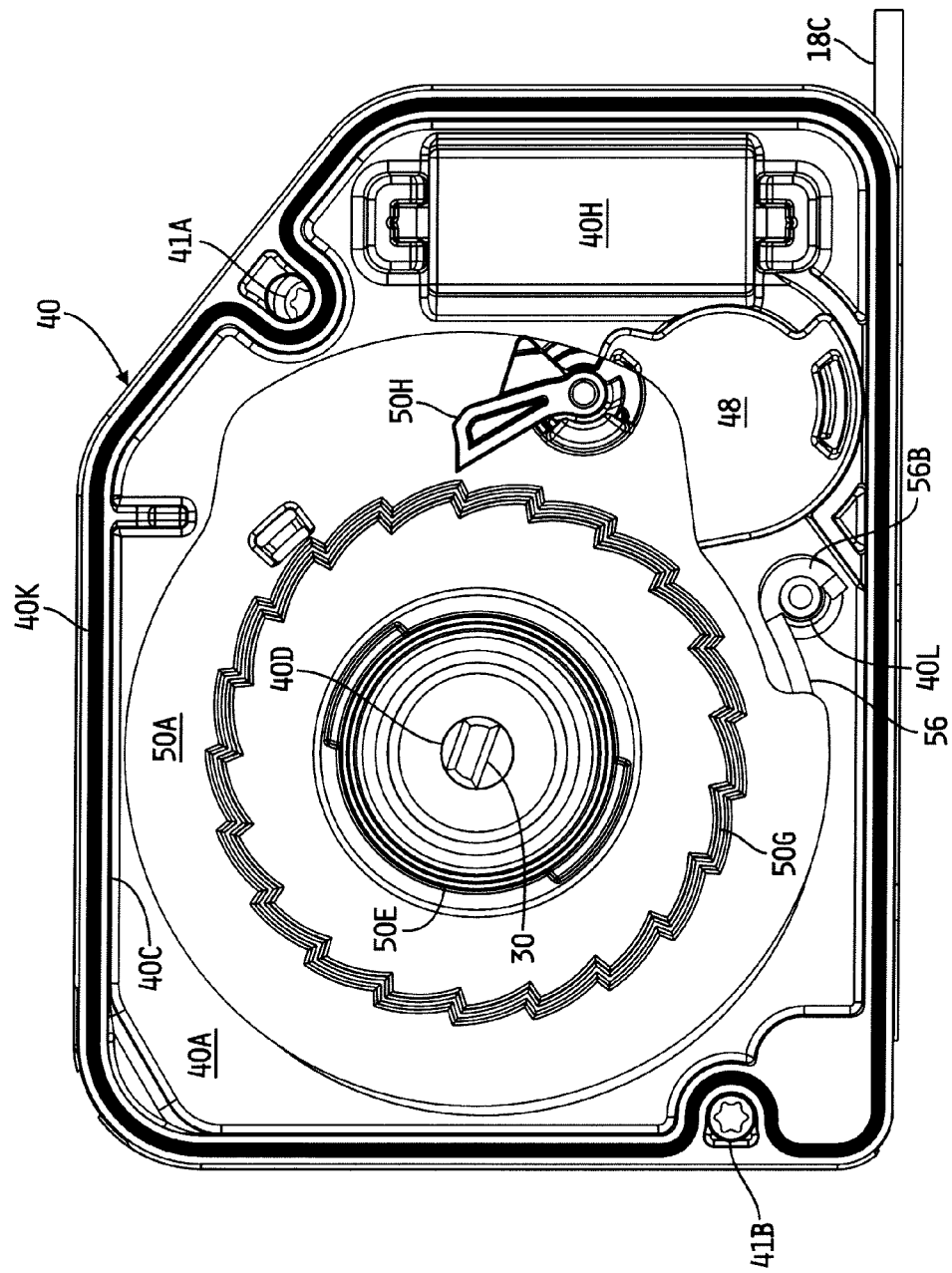
FIG. 9 is a plan view similar to FIG. 7 shown with the locking plate of FIGS. 5 and 8 mounted within the housing of the apparatus.

Referring now to FIG. 9, the locking plate 50 is shown mounted within the housing 50 with the opening 50E engaging ridges defined in the inner surface 40A of the housing 40 and with the hooked end 56B of the biasing wire 56 engaging, e.g., looped around, a protrusion 40L extending upwardly away from the inner surface 40A of the housing 40. The biasing member 56 normally biases the locking plate in the position illustrated in FIG. 9, and in this position the locking plate engagement member 48 is in the position illustrated in FIGS. 7 and 9. In this position, hereinafter referred to as the unlocked position of the locking bar 32 in which the locking bar 32 does not engage the ratchet wheels 34A and 34B of the spool 20 and in which the locking bar 32 therefore does not lock rotation of the spool 20, the post 50F defined on the underside 50B of the locking plate 50 does not exert force on the lobe or arm 48G of the locking bar engagement member 48 and the normal bias applied to the locking bar 32 (discussed hereinabove) therefore maintains the locking bar in the unlocked position. In this position, web can therefore be paid out from the spool 20.

During locking conditions of the retractor 14, i.e., when the actuator 54 has been actuated as will be described hereinafter, force applied to the spool 20 in the web payout direction of the spool 20 rotates the locking plate 50 counterclockwise about the spool shaft 30 against the bias of the biasing member 56, as will be described in greater detail hereinafter. This counterclockwise movement of the locking plate 50 causes the post 50F of the movable plate 50 to force the lobe or arm 48G of the locking bar engagement member 48 downward relative to the housing 40 toward the protrusion 40L such that the locking bar engagement member 48 moves the locking bar 32 to a locked position in which the locking bar 32 engages the ratchet wheels 34A and 34B of the spool 20, thereby locking the spool 20 from further rotation in the web payout direction.

Referring again to FIGS. 5 and 9, the top surface 50A of the locking plate 50 illustratively defines an annular toothed ring 50G about the opening 50E with an annular well defined between the toothed ring 50G and the opening 50E. This annular well is sized to receive therein the clutch 52 illustrated in FIG. 5. A pawl 50H is mounted to the top surface 50A of the locking plate 50, and is normally biased away from the toothed ring 50G.

Referring now to FIG. 10, the clutch 52 of FIG. 5 has been mounted to the locking plate 50 and to the spool shaft 30 through the slot in the clutch 52 illustrated in FIGS. 5 and 10. The clutch 52 is illustratively an annular member having a number of teeth formed about its outer periphery. The clutch 52 rotates with the spool shaft 30 relative to the locking plate 50 which generally remains stationary when the retractor 14 is not locked.

In FIG. 10, the locking actuator 54 has also been installed in the pocket 40H formed into the inner surface 40A of the base 40M of the housing 40. The locking actuator 54 illustratively includes a ball 60 and an actuating arm 62 which contacts the pawl 50H under locking conditions. During non-locking conditions of the retractor 14, the pawl 50H is biased away from the teeth of the clutch 52 as described above, and the biased pawl 50H in turn biases the actuating arm 62 toward the locking actuator 54. During such non-locking conditions, the spool 20 may rotate in the web payout direction such that web may be paid out therefrom. During certain locking conditions of the retractor 14, e.g., gravity-based and inertial-based locking conditions, the ball 60 moves against and forces the actuating arm 62 against the pawl 50H, which moves the pawl 50H into contact with the teeth of the clutch 52. Rotation of the spool shaft 30 in the web payout direction under such conditions brings one of the teeth of the clutch 52 into contact with the pawl 50H, thereby blocking further rotation of the clutch 52 and locking the clutch 52 to the locking plate 50. Further rotation of the spool shaft 30 in the web payout direction applies a rotational force to the combination of the clutch 52 and the locking plate 50 in the counterclockwise direction against the biasing member 56. When this rotational force is greater than the biasing force of the biasing member 56, the resulting rotational movement of the combination of the clutch 52 and the locking plate 50 in the counterclockwise direction causes the post 50F on the underside of the locking plate 50 to act against and move the lobe or arm 48G of the locking bar engagement member 48 downwardly toward the protrusion 40L of the housing 40. This movement of the locking bar engagement member 48, in turn, causes the locking bar 32 to move into engagement with the ratchet wheels 34A and 34B of the spool 20 to thereby lock the spool 20 in the web payout direction.

Referring now to FIG. 11, a plan view is shown of the inner surface 42A of one illustrative embodiment of the cover 42 illustrated in FIG. 1. Illustratively, the inner surface 42A defines a protrusion 42E which, when the cover 42 is mounted and sealed to the open end of the housing 40, extends over the locking bar engagement member 48 and acts to maintain the locking bar engagement member 48 in place in the event the locking bar engagement member 48 moves axially relative to the opening 40E through the housing 40. The inner surface 42A also defines a protrusion 42G with an opening sized to receive therein the protrusion 40L of the housing 40 when the cover 42 is mounted and sealed to the open end of the housing 40. The protrusion 42G maintains the looped end 56B of the wire 56 on the protrusion 40L after the cover 42 is mounted to the housing 40. The inner surface 42A also defines another protrusion 42H and a lip 42I that extends radially about the inner surface between the protrusions 42G and 42H. The protrusion 42H and the lip 42I both extend over the locking plate 50 and act to maintain the locking plate 50 in place in the event the locking plate 50 moves axially relative to the spool shaft 30 within the housing 40. The inner surface 42A further defines a pair of protrusions 42J and 42K which extend over opposite ends of the locking actuator 54 and act to maintain the locking actuator in place within the pocket 40H of the housing 40.

Figure 12:
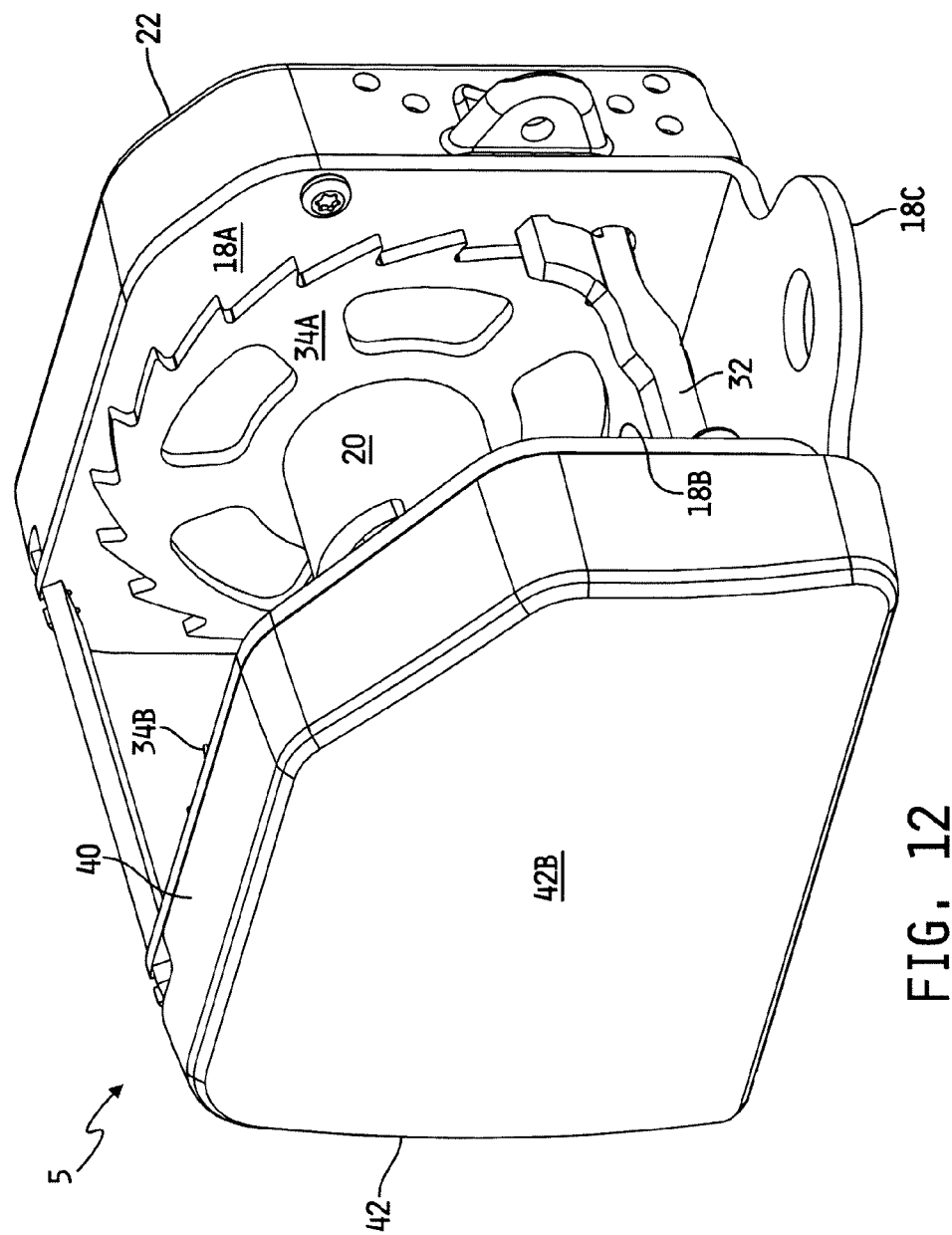
FIG. 12 is a perspective view of the apparatus of FIG. 1 as assembled.

Referring now to FIGS. 10 and 11, the free end of the sidewall 40C of the housing 40 illustratively defines a channel or groove 40K therein, and the free end of the cover 42 defines a complementarily configured lip 42F. The lip 42F is received within the channel 40K when the cover 42 is mounted to the open end of the housing 40. Alternatively, the free end of the sidewall 40C of the housing may define the lip and the free end of the cover 42 may define the channel. In any case, the channel 40K and the lip 42F cooperate to form a hermetic seal between the open end of the housing 40 and the cover 42. In one embodiment, for example, a conventional ultrasonic welding process may be employed to cause the lip 42F to melt into the channel 40K, thereby hermetically sealing the cover 42 to the open end of the housing 40. Alternatively, a bonding medium, e.g., adhesive, may be interposed between and in contact with the lip 42F and the channel 40K, or between and in contact with opposing free ends of the cover 42 and the housing 40 in embodiments which do not include the channel 40K and the lip 42F, to thereby bond and hermetically seal the cover 42 to the open end of the housing 40. Those skilled in the art will recognize other conventional processes and structures for forming a hermetic seal between the open end of the housing 40 and the cover 42, and any such other conventional process and/or structure is contemplated by this disclosure. Referring to FIG. 12, the resulting retractor 5 with hermetically sealed locking components is shown with the cover 42 hermetically sealed to the open end of the housing 40, i.e., attached to the end of the sidewall 40C of the housing 40.

Figure 13:
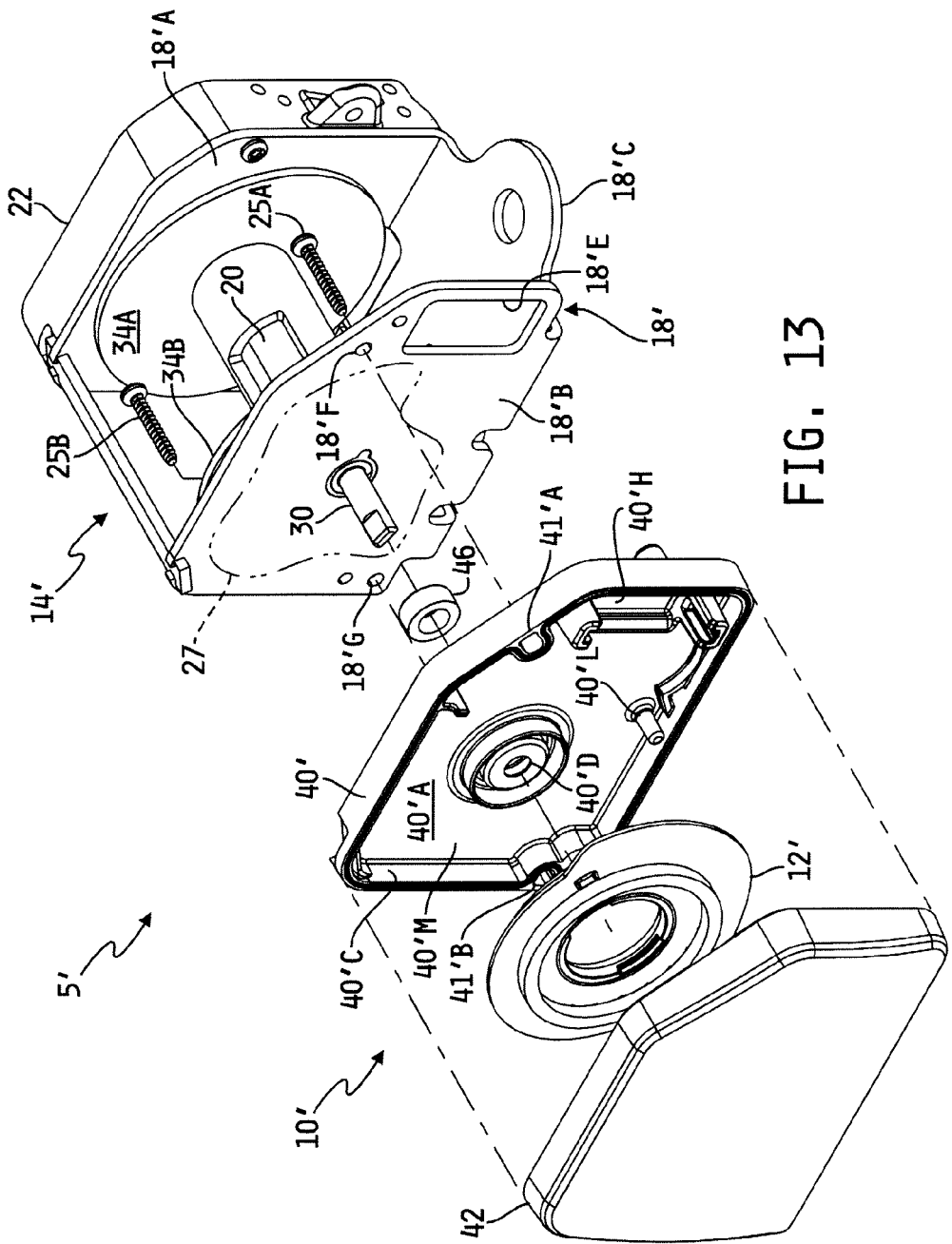
FIG. 13 is a perspective and partial assembly view of an alternate embodiment of an apparatus for hermetically sealing locking components of a locking retractor.

The concepts of this disclosure may alternatively be used with locking retractors of the ELR and/or ALR variety in which the locking components alone operate to lock the spool shaft 30 from rotating in the web payout direction during locking conditions. Referring to FIG. 13, such an alternate embodiment is shown in which the retractor 14' does not include a locking bar 32 as illustrated in FIG. 1. In this embodiment, the housing 40' is modified to omit the opening 40E illustrated in FIG. 1, and the sealing member 44 is likewise omitted. The base 40'M of the housing 40' therefore defines only a single opening 40'D therethrough, and a single sealing member 46 is configured to extend about and engage the periphery of the opening 40'D such that the sealing member 46 extends about and engages the periphery of the spool shaft 30 when the base 40'M of the housing 40' is mounted to the sidewall 18'B of the frame 18'. A hermetic seal is thereby formed between the housing 40' and the spool shaft 30, and the cover 42 is hermetically sealed to the open end of the housing 40' as described above such that the housing 40' is hermetically sealed from external contamination. In operation, the locking components 12' operate in a conventional manner to lock and unlock rotation of the spool 20 in the web payout direction without the aid of a locking bar of the type illustrated in FIG. 1. As an alternative to the embodiment illustrated in FIG. 13, the retractor 14' need not omit the locking bar 32. Thus, the locking bar 32 may be included as illustrated in FIG. 1, but the spool locking apparatus 12' will not engage or otherwise interface with the locking bar 32. In such embodiments, the base 40'M may be modified, such as providing a channel but without providing an opening therethrough, to accommodate any portion of one end of the locking bar 32 that may extend beyond the outer surface of the frame sidewall 18'B.

In any case, the locking components 12' alone operate to lock the spool 20 from rotating in the web payout direction during locking conditions in the embodiment illustrated in FIG. 13. In contrast, rotation of the spool 20 in the web payout direction in the embodiment illustrated in FIGS. 1-12 causes the locking components 12 to control the locking bar 32 to selectively lock the spool 20 from rotating in the web payout direction. Thus, in both of the illustrated embodiments, the locking components 12, 12' cooperate with the spool shaft 30 to selectively lock rotation of the spool 20. In the embodiment illustrated in FIGS. 1-12, the locking components 12 further control the position of the locking bar to selectively lock the spool relative to the frame 18, whereas in the embodiment illustrated in FIG. 13 the locking components 12' alone operate to selectively lock the spool relative to the frame 18'.

Figure 14:
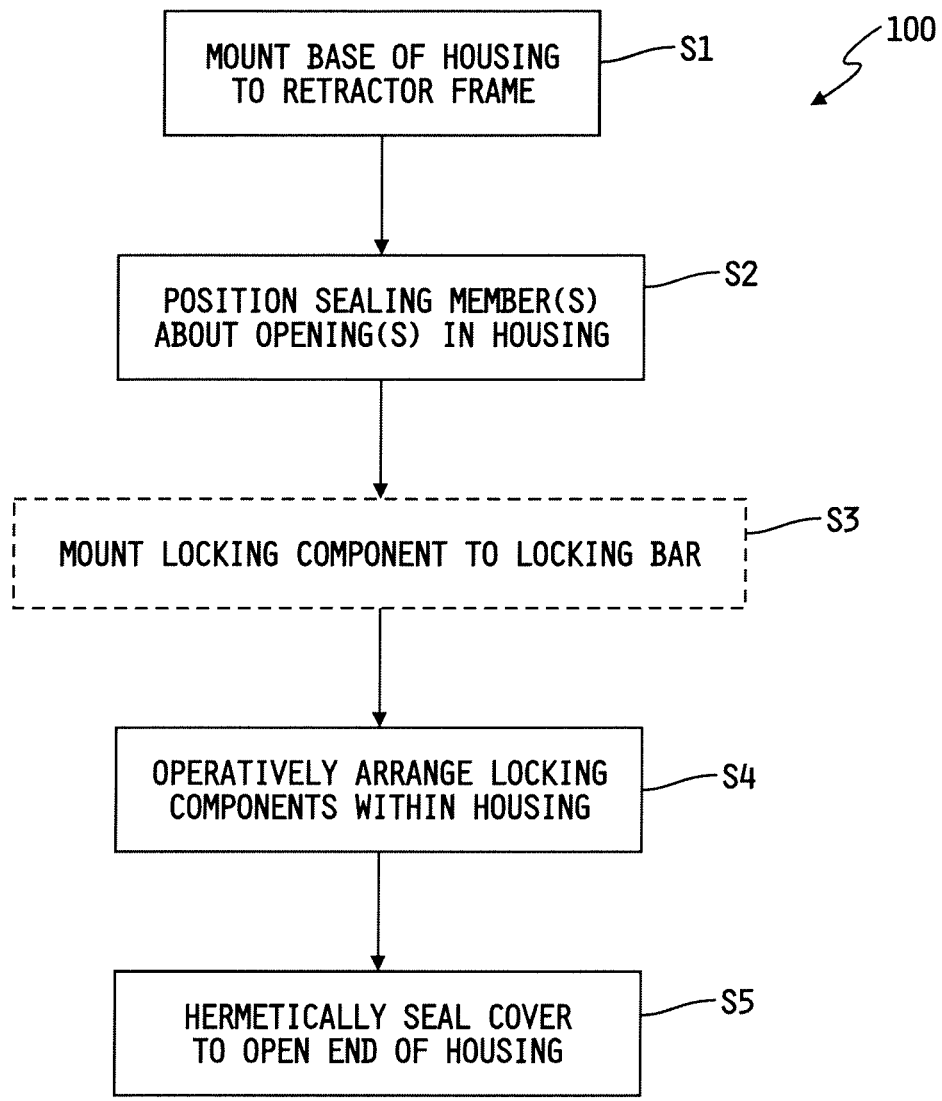
FIG. 14 is a flowchart of an illustrative process for hermetically sealing locking components, i.e., a spool locking assembly, of a retractor.

Referring now to FIG. 14, a flowchart is shown of one illustrative process 100 for hermetically sealing locking components of a retractor. It will be understood that in the flowchart illustrated in FIG. 14, the steps are not necessarily executed in the sequence shown, and that one or more steps can include or be merged with one or more other steps. The process 100 is applicable to the embodiment illustrated in FIGS. 1-12 and also to the embodiment illustrated in FIG. 13. In any case, the process 100 begins at step S1 where the base 40M, 40'M is mounted to the retractor frame 18, 18' using one or more of the mounting techniques described herein. At step S2, the sealing member(s) 44 and/or 46 is/are positioned about the opening(s) 40D, 40E, 40'D in the housing 40, 40'. In embodiments which include a locking bar 32 and in which one of the locking components 12 engages the locking bar 32, such a locking component is mounted to the locking bar 32 at step S3, shown in dashed-line form to indicate that step S3 is executed only in certain embodiments. In any case, the locking components 12, 12' are operatively arranged within the housing 40, 40' at step S4, and at step S5 the cover 42 is hermetically sealed to the open end of the housing 40, 40' using one or more of the sealing techniques described hereinabove.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, the concepts of this disclosure may alternatively still be used with locking retractors in which the locking components do not cooperate with the spool shaft 30, but rather control the locking bar 32 to selectively lock the spool 20 from rotating in the web payout direction based only on conditions other than those associated with rotation of the spool 20. Such conditions may include, for example, but should not be limited to, changes in inertia sensed by an apparatus such as the locking actuator 54 illustrated and described hereinabove, changes in position of the retractor relative to the direction of gravitational force, and the like. In such an embodiment, for example, the base 40M of the housing 40 will define only a single opening 40E therethrough with a sealing member 44 configured to extend about and engage the periphery of the opening 40E such that the sealing member 44 forms a hermetic seal between one of the locking components and the opening 40E of the housing. In this embodiment, the opening 40D illustrated in FIGS. 1-12 can be omitted, as can the sealing member 46 and the extended spool shaft 30. To the extent the spool shaft 30 extends beyond the frame sidewall 18B, the spool locking apparatus 12 will not engage or otherwise interface with the spool shaft 30 and in such embodiments, the base 40M may be modified, such as providing a channel but without providing an opening therethrough, to accommodate any portion of the spool shaft 30 that may extend beyond the outer surface of the frame sidewall 18B. In operation, the locking components 12 operate to lock and unlock rotation of the spool shaft 30 in the web payout direction strictly by controlling movement of the locking bar 32 relative to the frame 18.

What is claimed is:

1. An apparatus for sealing locking components of a retractor, wherein the locking components cooperate with a spool shaft extending from a rotatable spool of the retractor to selectively lock rotation of the spool, and wherein the spool shaft rotates with the rotatable spool, the apparatus comprising:
    an open-ended housing having a base defining a first opening therethrough into an interior of the housing, the base of the housing mounted to the retractor with the spool shaft accessible via the first opening, the locking components arranged within the interior of the housing,
    a first sealing member extending about and engaging a periphery of the first opening and also extending about and engaging a periphery of the spool shaft, the first sealing member blocking ingress of moisture and particles to the locking component, and
    a cover hermetically attached to the open end of the housing.

2. The apparatus of claim 1 wherein the housing and the cover are each formed of a polymer.

3. The apparatus of claim 1 wherein the locking components are configured to cooperate with the spool to form at least one of an emergency locking retractor and an automatic locking retractor.

4. The apparatus of claim 1 wherein the housing defines a first channel extending into the base of the housing about the first opening, the first channel sized to receive and retain therein the first sealing member,
    and wherein the first sealing member is positioned within the first channel such that the first sealing member engages the housing about the first opening and also engages the spool shaft about the spool shaft when the housing is mounted to the retractor, the first sealing member thereby forming a seal between the first opening of the housing and the spool shaft to block the ingress of moisture and particles to the locking components.

5. The apparatus of claim 4 wherein the first channel extends into one of an inner surface and an outer surface of the base of the housing about the first opening.

6. The apparatus of claim 1 wherein the retractor further includes a frame sidewall through which the spool shaft extends and to which the base of the housing is mounted, and a locking bar movably mounted to the frame sidewall and engageable with the spool to lock rotation of the spool relative to the frame sidewall, and wherein the locking components control a position of the locking bar to selectively lock the spool relative to the frame sidewall, and wherein the base of the housing further defines a second opening therethrough, separate from the first opening, such that one end of the locking bar is accessible through the second opening when the base of the housing is mounted to the frame sidewall, and wherein one of the locking components is mounted to the one end of the locking bar, and wherein the apparatus further comprises a second sealing member extending about and engaging a periphery of the second opening and also extending about a periphery of the locking bar such that the second sealing member forms a seal between the one of the locking components and the second opening to block the ingress of moisture and particles to the locking components.

7. The apparatus of claim 6 wherein the housing defines a second channel extending into the base of the housing about the second opening, the second channel sized to receive and retain therein the second sealing member, and wherein the second sealing member is positioned within the second channel such that the second sealing member engages the housing about the second opening and also engages the one of the locking components mounted to the one end of the locking bar when the housing is mounted to the retractor, the second sealing member thereby forming the seal between the second opening of the housing and the one of the locking components to block the ingress of moisture and particles to the locking components.

8. The apparatus of claim 7 wherein the second channel extends into one of an inner surface and an outer surface of the base of the housing about the second opening.

9. The apparatus of claim 6 wherein the locking components are configured to cooperate with the spool and with the locking bar to form at least one of an emergency locking retractor and an automatic locking retractor.

10. A locking retractor comprising:
a frame defining two opposing sidewalls,
a rotatable spool extending between the two sidewalls,
a spool shaft extending from and rotating with the spool, one end of the spool shaft extending through one of the sidewalls,
an open-ended housing having a base defining a first opening therethrough into an interior of the housing, the base of the housing mounted to the one of the sidewalls with the spool shaft accessible via the first opening of the open-ended housing,
one or more locking components arranged within the interior of the housing, the one or more locking components configured to cooperate with the spool shaft to selectively lock rotation of the spool relative to the frame,
a first sealing member extending about and engaging a periphery of the first opening and also extending about and engaging a periphery of the spool shaft, the first sealing member forming a seal to block ingress of moisture and particles to the one or more locking components, and
a cover hermetically attached to the open end of the housing with the one or more locking components contained within the interior of the housing.

11. The retractor of claim 10 wherein the one or more locking components are configured to cooperate with the spool shaft to form at least one of an emergency locking retractor and an automatic locking retractor.

12. The retractor of claim 10 further comprising:
at least one ratchet wheel mounted to and rotatable with the spool,
a locking bar mounted between the two opposing sidewalls of the frame, the locking bar movable relative to the frame between a first position in which the locking bar engages the at least one ratchet wheel and a second position in which the locking bar does not engage the at least one ratchet wheel, one end of the locking bar extending through the one of the sidewalls, wherein the base of the open-ended housing defines a second opening therethrough separate from the first opening, and the one end of the locking bar is accessible via the second opening, and wherein one of the one or more locking components is mounted to the one end of the locking bar, and
a second sealing member positioned to extend about and engage a periphery of the second opening and to also extend about the locking bar such that the second sealing member forms a seal between the one of the one or more locking components and the second opening to block ingress of moisture and particles to the one or more locking components, wherein the one or more locking components control the locking bar between the first and second positions thereof to selectively lock the spool relative to the frame sidewall.

13. The apparatus of claim 12 wherein the locking components are configured to cooperate with the spool and with the locking bar to form at least one of an emergency locking retractor and an automatic locking retractor.

14. The apparatus of claim 10 wherein the housing and the cover are each formed of a polymer.

* * * * *